US008446534B2

(12) United States Patent
Hsieh et al.

(10) Patent No.: US 8,446,534 B2
(45) Date of Patent: May 21, 2013

(54) MULTIDIMENSIONAL DISPLAY APPARATUS

(75) Inventors: Kuan-Hong Hsieh, New Taipei (TW); Han-Che Wang, New Taipei (TW); Bo-Ching Lin, New Taipei (TW); Hui Yin, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 241 days.

(21) Appl. No.: 13/110,891

(22) Filed: May 18, 2011

(65) Prior Publication Data

US 2012/0120353 A1 May 17, 2012

(30) Foreign Application Priority Data

Nov. 12, 2010 (CN) .......................... 2010 1 0542309

(51) Int. Cl.
*G02F 1/1335* (2006.01)
*G02F 1/133* (2006.01)
*G03B 21/56* (2006.01)
*G03B 21/60* (2006.01)

(52) U.S. Cl.
USPC ....... 349/5; 349/73; 349/7; 359/449; 359/458

(58) Field of Classification Search
USPC .............................. 349/5, 7, 73; 359/449, 458
See application file for complete search history.

(56) References Cited

U.S. PATENT DOCUMENTS 5,539,483 A * 7/1996 Nalwa ............................ 353/94
6,644,816 B1 * 11/2003 Perra et al. .................... 353/119
2005/0094111 A1 * 5/2005 May ............................... 353/98

FOREIGN PATENT DOCUMENTS

CN 200997013 Y 12/2007

* cited by examiner

*Primary Examiner* — Wen-Ying P Chen
(74) *Attorney, Agent, or Firm* — Altis Law Group, Inc.

(57) ABSTRACT

A multidimensional display apparatus includes a main display screen divided into at least three display areas including a first centre display area and at least two surrounded display areas, at least two reflective elements, and at least three display surfaces. The reflective elements are arranged above and inclined with respect to the second display areas, and a reflection surface of each of the reflective elements faces the corresponding second display area. One of the display surfaces is above the first display area, and the other two are corresponding to the second display areas, facing the reflection surfaces of the reflective elements. The contents displayed on the first display area is viewable on the display surface above, and the contents displayed on the second display areas are reflected by the corresponding reflection surfaces of the reflective elements and viewable on the other two display surfaces.

7 Claims, 9 Drawing Sheets

(1) (2)

(1)

(2)

MULTIDIMENSIONAL DISPLAY APPARATUS

BACKGROUND

1. Technical Field

The present disclosure relates to display apparatuses, and particularly, to a multidimensional display apparatus.

2. Description of the Related Art

Some electronic devices include a single side display screen to display information. It could be useful if a display can provide multiple display faces for displaying information that is viewable from different directions.

BRIEF DESCRIPTION OF THE DRAWINGS

The components in the drawings are not necessarily drawn to scale, the emphasis instead being placed upon clearly illustrating the principles of a multidimensional display apparatus. Moreover, in the drawings, like reference numerals designate corresponding parts throughout the several views.

DETAILED DESCRIPTION

Figure 1:
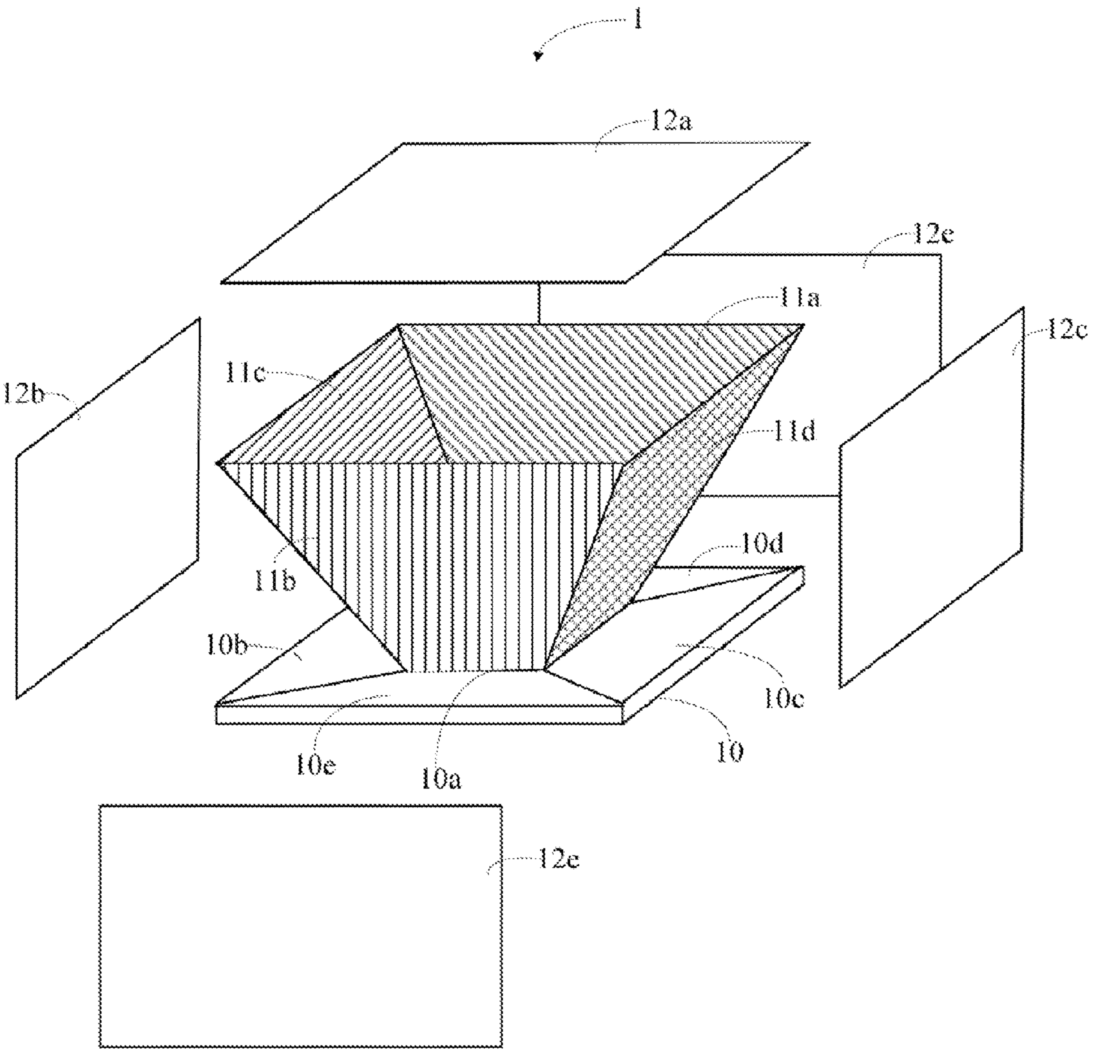
FIG. 1 is an exploded perspective view of a multidimensional display apparatus in accordance with a first exemplary embodiment.
Figure 2:
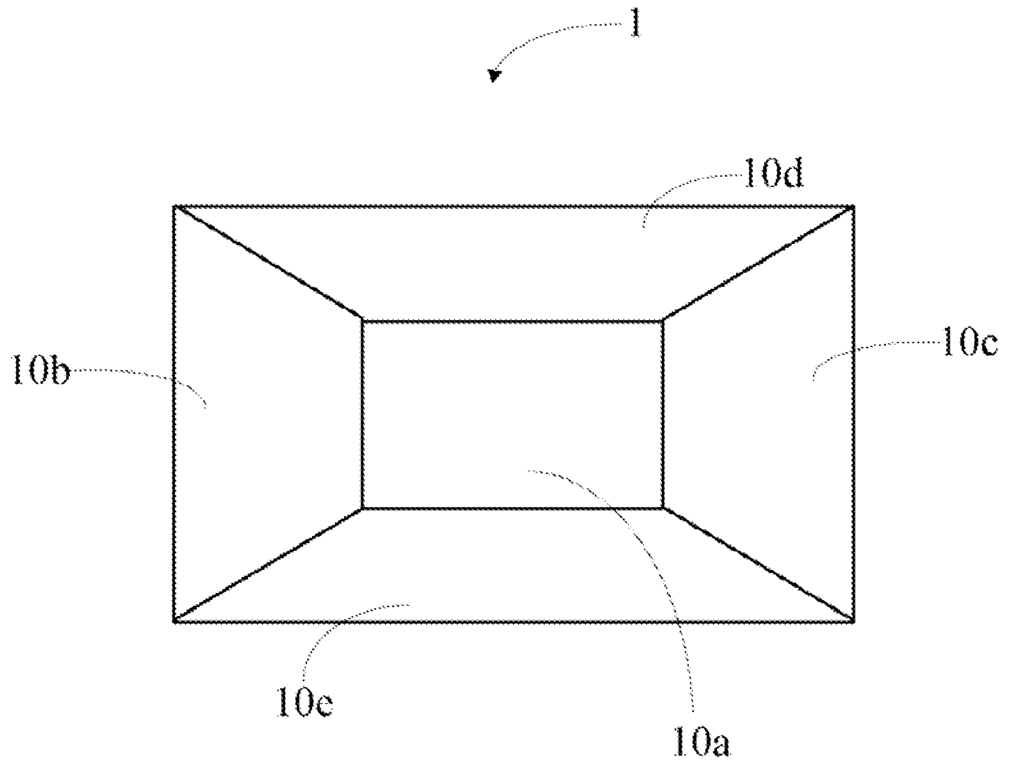
FIG. 2 is a cross-sectional plan view showing a multidimensional display apparatus of FIG. 1.

Referring to FIGS. 1 and 2, a multidimensional display apparatus 1, in accordance with a first exemplary embodiment, includes a main display screen 10, four reflective elements 11*a*-11*d*, and five display surfaces 12*a*-12*e*. The reflective elements 11*a*-11*d* are configured for reflecting light beams projected on reflection surfaces of the reflective elements 11*a*-11*d*. The main display screen 10 is a rectangular liquid crystal display (LCD) screen. The main display screen 10 is divided into five display areas, including a central display area 10*a* located in the center of the main display screen 10, and four display areas 10*b*-10*e* surrounding the central display area 10*a*, can display information thereon. The four reflective elements 11*a*-11*d* are respectively arranged above and inclined with respect to the display areas 10*b*-10*e*, with the reflection surfaces facing the corresponding display areas 10*b*-10*e*, respectively.

The five display surfaces 12*a*-12*e* are disposed corresponding to the five display areas 10*a*-10*e*. Wherein, the display surface 12*a* is disposed above the central display area 10*a*, and parallel to the central display area 10*a*. The display surfaces 12*b*-12*e* protrude vertically from the edges of the main display screen 10. Each of the display surfaces 12*b*-12*e* faces the reflection surfaces of the reflective elements 11*a*-11*d*, respectively.

The content displayed on the central display area 10*a* is viewable on the display surface 12*a*. The contents displayed on each of the display areas 10*b*-10*e* can be reflected by the corresponding reflective elements 11*a*-11*d* and are viewable on the corresponding display surfaces 12*b*-12*e*. The reflective elements and the display surfaces can vary in size and number in accordance with the sizes and the number of the display areas of the main display screen 10. In the embodiment, the four reflective elements 11*a*-11*d* are mirrors. In an alternative embodiment, the four reflective elements 11*a*-11*d* may be made of materials with reflection characteristic.

Figure 3:
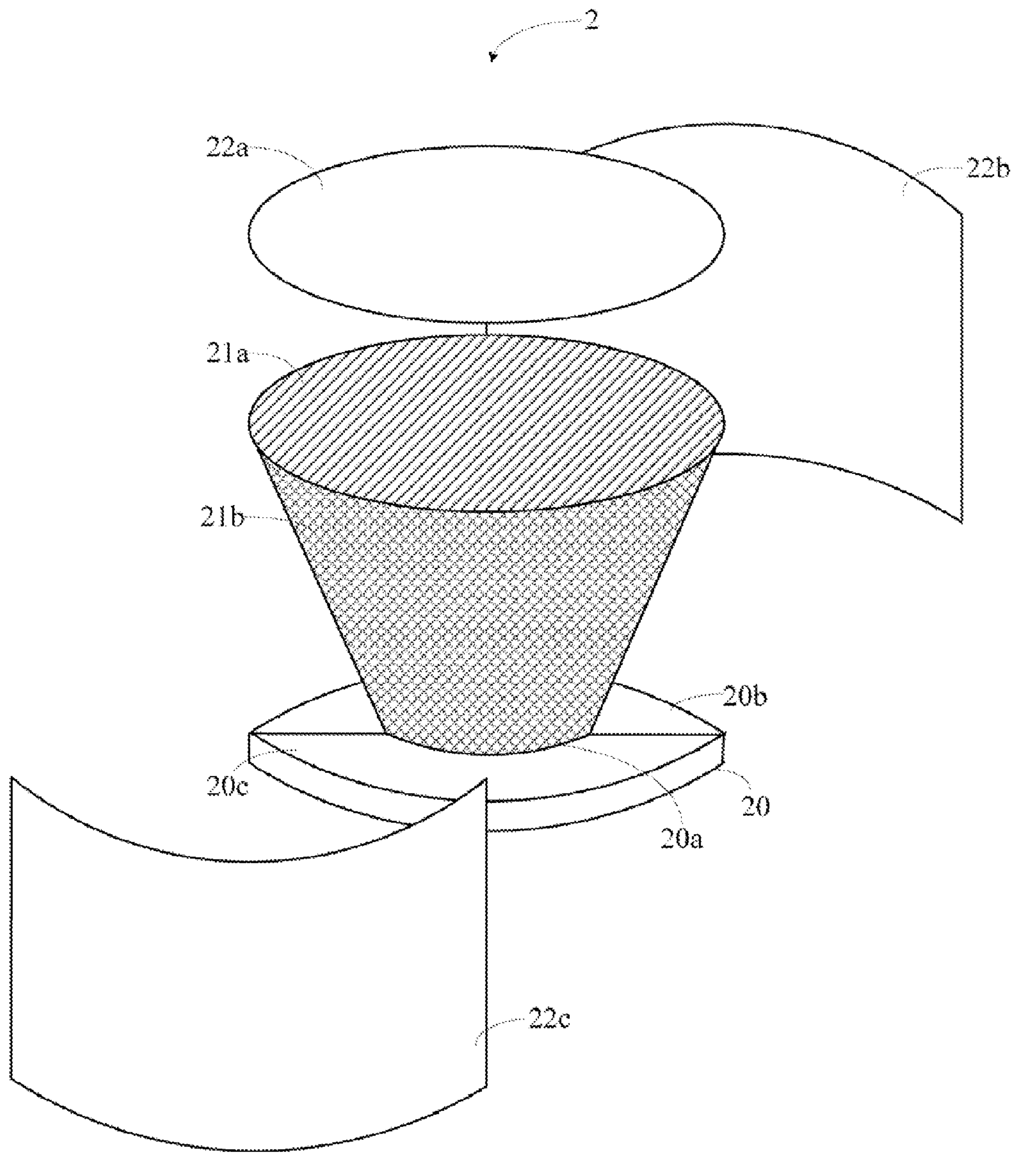
FIG. 3 is an exploded perspective view of the multidimensional display apparatus in accordance with a third exemplary embodiment.
Figure 4:
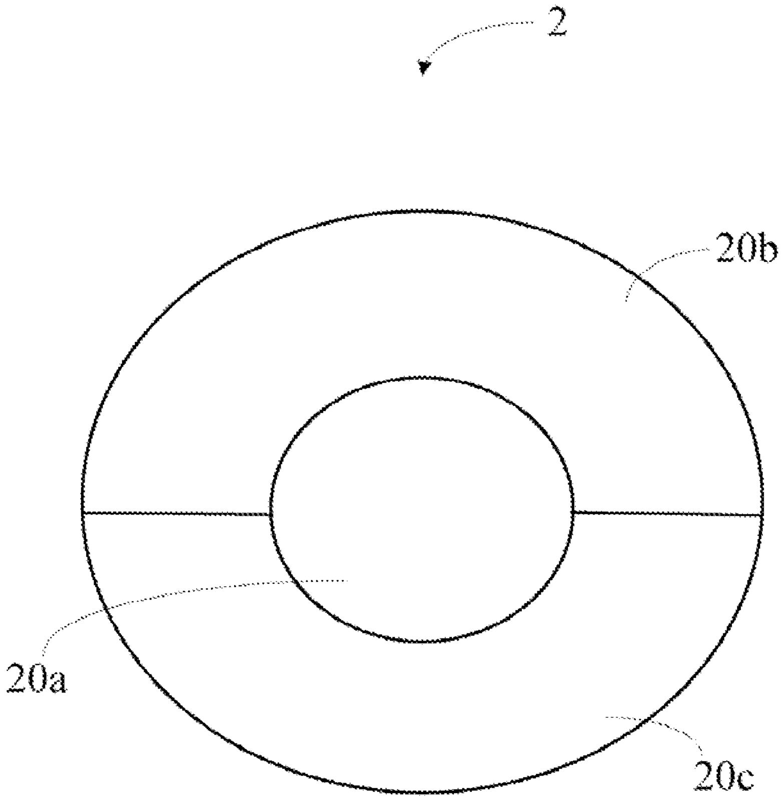
FIG. 4 is a cross-sectional plan view showing a multidimensional display apparatus of FIG. 3.
Figure 5:
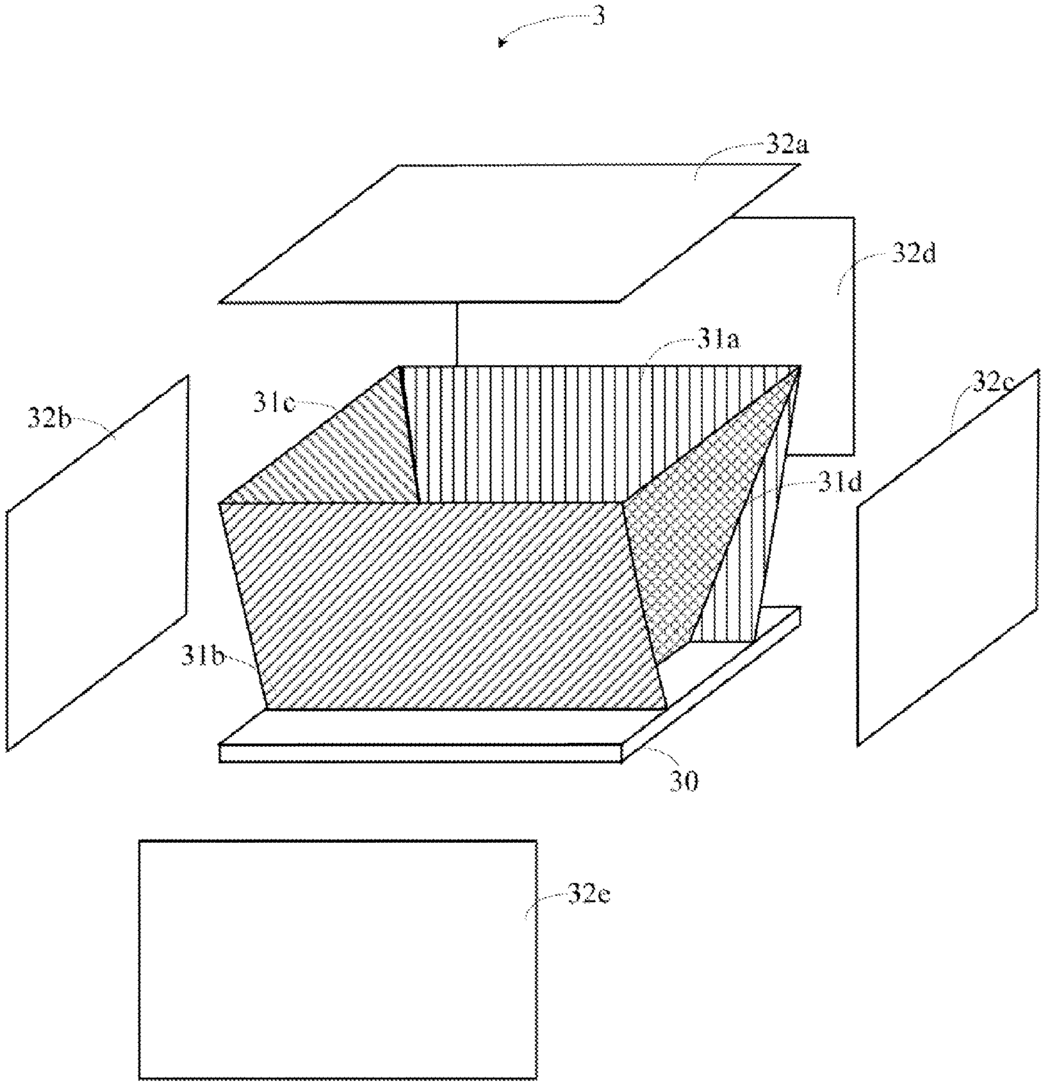
FIG. 5 is an exploded perspective view of the multidimensional display apparatus in accordance with a third exemplary embodiment.
Figure 6:
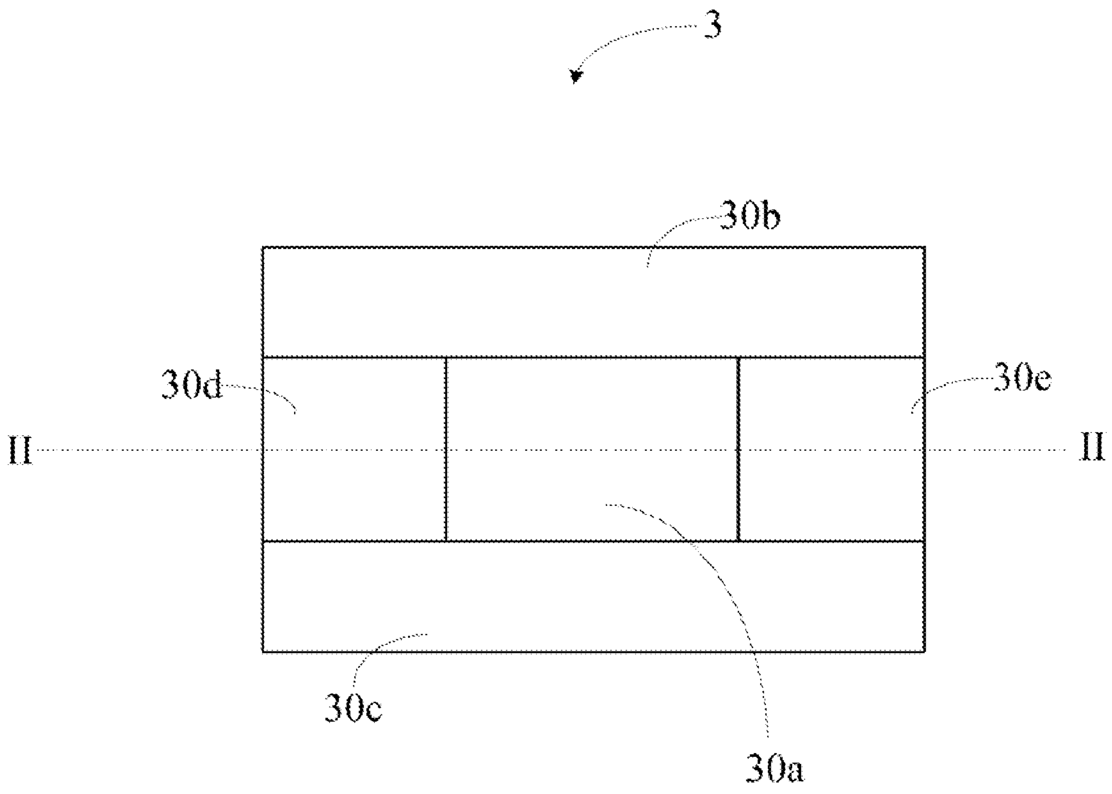
FIG. 6 is a cross-sectional plan view showing a multidimensional display apparatus of FIG. 5.
Figure 7:
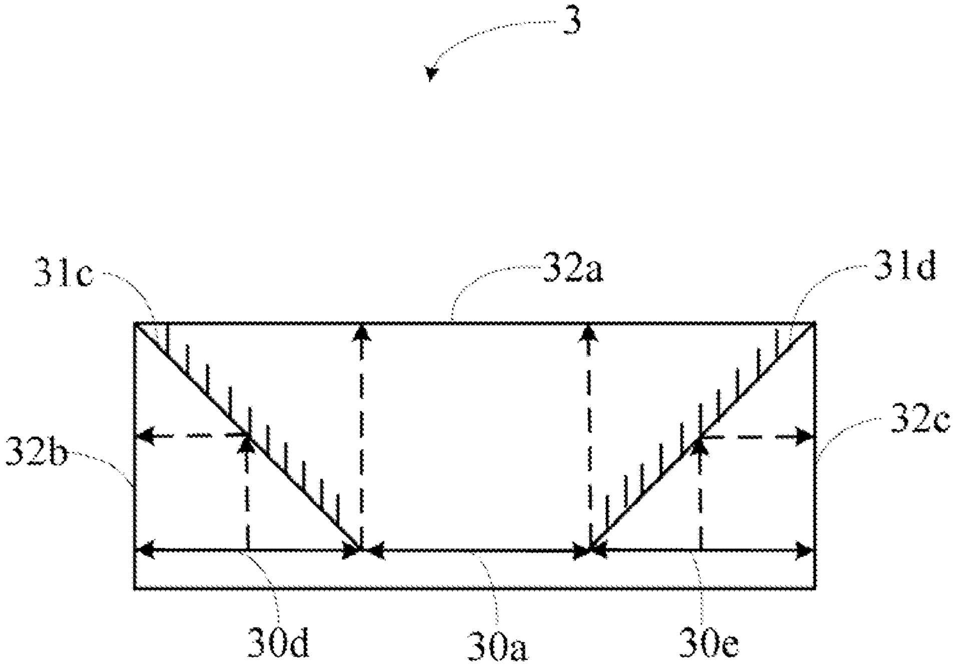
FIG. 7 is a cross-sectional view taken along the line II-II of FIG. 6.

Referring to FIGS. 3 and 4, in a second embodiment, the multidimensional display apparatus 2 includes the round main display screen 20, two reflective elements 21*a* and 21*b*, and three display surfaces 22*a*-22*c*. The main display screen 20 is divided into three display areas 20*a* - 20*c*, including the central display area 20*a* in the center of the main display screen 20, and the two display areas 20*b* and 20*c* surrounding the central display area 20*a*. The reflection surfaces of the two reflective elements 21*a* and 21*b* face the display areas 20*b* and 20*c*. The display surface 22*a* is above and parallel to the display area 20*a*. The display surfaces 22*b* and 22*c* extend along the edge of the main display screen 20. The content displayed on the display area 20*a* is viewable on the display surface 22*a*, and the contents displayed on the display areas 20*b* and 20*c* are reflected by the reflective elements 21*a* and 21*b* correspondingly and viewable on the display surfaces 22*b* and 22*c*. User can watch the content displayed in any direction, surrounding the multidimensional display apparatus 1.

Referring to FIGS. 4-7, in a third embodiment, the multidimensional display apparatus 3 includes the main display screen 30, four reflective elements 31*a*-31*d*, and five display surfaces 32*a*-32*e*. The main display screen 30 is divided into five display areas, including a central display area 30*a* in the center of the main display screen 30, and four display areas 30*b*-30*e* surrounding the central display area 30*a*. The four reflective elements 31*a*-31*d* are all mirrors. The reflection surface of each of the four reflective elements 31*a*-31*d* faces and tilts with respect to the corresponding display area 30*b*-30*e*. The angle between each reflection element and its corresponding display area is about 45 degrees. The display surface 32*a* is above and parallel to the display area 30*a*. The display surfaces 32*b*-32*e* extend along the edge of the main display screen 30. The content displayed on the display area 30*a* is viewable on the display surface 32*a*, and the content displayed on the display areas 30*b*-30*e* are respectively reflected by the corresponding reflection elements 31*a*-31*d* and viewable on the corresponding display surfaces 32*b*-32*e*.

Figure 8:
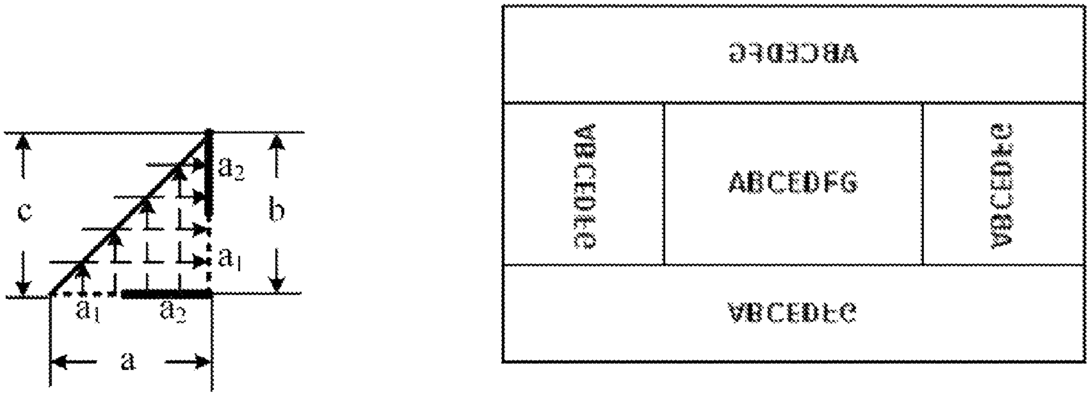
FIG. 8 is an enlarged view of a display area of FIG. 3 in accordance with an exemplary embodiment.

Referring to FIG. 8, the content, reflected by the reflective element and viewable on the display surface as shown in portion (2), is reversed. For example, as shown in portion (1) of FIG. 8, "$a_1$" and "$a_2$" are contents displayed on the display area "a". If a person views the display area directly, the "$a_1$" is above the "$a_2$". However, after being reflected, the content viewed on the display surface "b" is that the "$a_2$" is above the "$a_1$". That is, the reflected image on the display surface is a reverse of the original image displayed on the display area "a". Therefore, to ensure that the reflected image can be normally shown on the display surfaces, the contents displayed on the display areas are preset to be reversed, inverted, or upside down.

Figure 9:
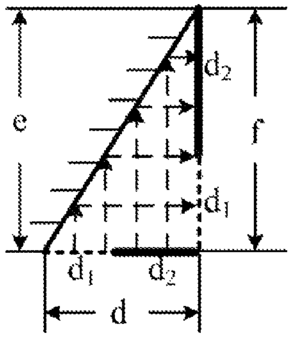
FIG. 9 is an enlarged view of a display area of FIG. 3 in accordance with an alternative exemplary embodiment.
Figure 9:
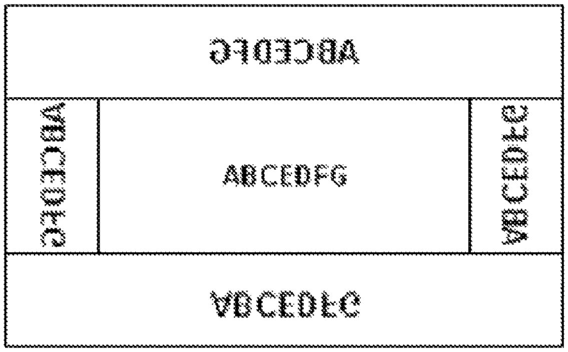

Referring to FIG. 9, the size of the reflected content on the display surfaces, as shown in portion (2), varies as the angle between the reflective element and the corresponding display area changes. For example, as shown in portion (1) of FIG. 9, "$d_1$" and "$d_2$" are contents displayed on display area "d". The angle between each reflection surface and its corresponding display area is about 60 degrees. It is clearly shown that, after being reflected, the size of the reflected content "$d_1$" is about f/d times the size of the original image "$d_1$". Similarly, the size of the reflected image "$d_2$" is about f/d times the size of the original image "$d_2$". The value of the radio f/d is determined by the angle between each reflection surface and its corresponding display area. Therefore, to ensure that the reflected image can be normally displayed on the display surfaces 32, the image displayed on the display areas are preset to be zoomed in or zoomed out according to the angels between the reflection surfaces of the reflective elements and the corresponding display areas.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A multidimensional display apparatus, comprising:

a main display screen divided into at least three display areas comprising a first display area in the center of the main display screen, and at least two second display areas surrounding the first display area, wherein the at least three display areas are operable to separately display contents thereon;

at least two reflective elements, arranged above and inclined with respect to the at least two second display areas, a reflection surface of each of the at least two reflective elements facing the corresponding second display area; and at least three display surfaces corresponding to the at least three display areas comprising a first display surface above the first display area, and at least two second display surfaces protrude vertically from the edges of the main display screen, facing the reflection surfaces of the at least two reflective elements;

wherein the contents displayed on the first display area is viewable on the first display surface, and the contents displayed on the at least two second display areas are respectively reflected by the reflection surfaces of the at least two reflective elements and viewable on the at least two second display surfaces.

2. The multidimensional display apparatus as recited in claim 1, wherein the first display surface is parallel to the first display area.

3. The multidimensional display apparatus as recited in claim 1, wherein the main display screen is a rectangular liquid crystal display (LCD) screen, and the at least three display areas comprise five display areas comprising a first display area located in the center of the main display screen, and four second display areas surrounding the first display area; the at least two reflective elements comprise four reflective elements respectively arranged above and inclined with respect to the four second display areas, and the reflection surface of each of the reflective elements faces the corresponding second display area; the at least three display surfaces comprise five display surfaces comprising a first display surface and four second display surfaces, the first display surface is above the first display area, and parallel to the first display area; and the four second display surfaces protrude vertically from the edges of the main display screen, and each of the four second display surfaces faces the reflection surface of the reflective elements.

4. The multidimensional display apparatus as recited in claim 1, wherein the main display screen is round, and the at least three display areas comprise three display areas comprising a first display area located in the center of the main display screen, and two second display areas surrounding the first display area; the at least two reflective elements comprise two reflective elements, the reflection surfaces of the two reflective elements face the two second display areas; the at least two display surfaces comprise three display surfaces comprising a first display surface and two second display surfaces, the first display surface is above and parallel to the first display area, and the two second display surfaces extends about the edge of the main display screen.

5. The multidimensional display apparatus as recited in claim 1, wherein the reflective elements are mirrors.

6. The multidimensional display apparatus as recited in claim 1, wherein an angle between the reflection surface of each of the at least two reflective elements and a corresponding one of the at least two display areas is about 45 degrees.

7. The multidimensional display apparatus as recited in claim 1, wherein an angle between the reflection surface of each of the at least two reflective elements and a corresponding one of the display areas is about 60 degrees.

* * * * *